US010784789B1

(12) United States Patent
Nasir et al.

(10) Patent No.: US 10,784,789 B1
(45) Date of Patent: Sep. 22, 2020

(54) SWITCHED MODE POWER SUPPLY WITH MULTI-MODE OPERATION AND METHOD THEREFOR

(71) Applicant: SEMICONDUCTOR COMPONENTS INDUSTRIES, LLC, Phoenix, AZ (US)

(72) Inventors: Anthony Michael Nasir, Mesa, AZ (US); Bryan Wayne McCoy, Phoenix, AZ (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/674,180

(22) Filed: Nov. 5, 2019

Related U.S. Application Data

(60) Provisional application No. 62/909,459, filed on Oct. 2, 2019.

(51) Int. Cl.
*H02M 3/335* (2006.01)
*H02M 1/08* (2006.01)
*H02M 1/00* (2006.01)
*H02M 1/44* (2007.01)

(52) U.S. Cl.
CPC ......... *H02M 3/33569* (2013.01); *H02M 1/08* (2013.01); *H02M 1/44* (2013.01); *H02M 2001/0032* (2013.01)

(58) Field of Classification Search
CPC ............... H02M 3/33569; H02M 1/08; H02M 2001/0032; H02M 1/44; G05F 1/00; G05F 1/10
See application file for complete search history.

(56) References Cited

U.S. PATENT DOCUMENTS

| 1,014,818 | A | 1/1912 | Edison |
| 6,975,087 | B1 | 12/2005 | Crabill et al. |
| 9,768,697 | B2 | 9/2017 | Fahlenkamp et al. |
| 9,991,800 | B2 | 6/2018 | Hari et al. |
| 2011/0194311 | A1* | 8/2011 | Gaknoki .............. H05B 45/382 363/21.12 |

* cited by examiner

*Primary Examiner* — Adolf D Berhane
*Assistant Examiner* — Afework S Demisse
(74) *Attorney, Agent, or Firm* — Polansky & Associates, P.L.L.C.; Paul J. Polansky; James Saragosa

(57) ABSTRACT

In one form, a method for generating a drive signal for a switch in a switched mode power supply includes receiving a feedback signal, generating a feedback voltage in response to the feedback signal, modulating a pulse width of the drive signal in response to the feedback voltage and a mode signal, generating a modulate signal in response to a magnitude of the feedback voltage crossing a first level in a first direction, generating the mode signal in response to the magnitude of the feedback voltage crossing a second level different from the first level in a second direction, and varying a gain between the feedback signal and the feedback voltage in response to the mode signal.

20 Claims, 7 Drawing Sheets

SWITCHED MODE POWER SUPPLY WITH MULTI-MODE OPERATION AND METHOD THEREFOR

CROSS-REFERENCE TO RELATED APPLICATIONS

This application claims the benefit of U.S. Provisional Patent Application No. 62/909,459, filed on Oct. 2, 2019, the entire contents of which is incorporated herein by reference.

FIELD OF THE DISCLOSURE

This disclosure relates generally to power converters, and more specifically to switched mode power supplies that operate under varying load conditions.

BACKGROUND

Switched mode power supplies can be used to create a direct current (DC) voltage from an alternating current (AC) voltage by switching current through an energy storage element such as a transformer. The duty cycle of the switching is controlled to regulate the output voltage to a desired level. Switched mode power supplies are generally efficient at heavier loads but less efficient at lighter loads. Two popular types of isolated switched mode power supplies are forward mode and flyback mode converters.

Flyback converters are common in AC voltage to DC voltage applications. A flyback converter is based on a flyback transformer that alternately builds up flux in the magnetic core and transfers energy to the output. When current is switched through the primary winding, the primary current in the transformer increases, storing energy within the transformer. When the switch is opened, the primary current in the transformer drops, inducing a voltage on the secondary winding. The secondary winding supplies current into the load. A controller varies the on- and off-times of a primary switch in series with the primary winding to regulate the output voltage to a desired level. Flyback converters generally operate with less efficiency at light loads than heavier loads.

In order to improve light load operation, some flyback converters can be configured to use different operating modes depending on the load of the power supply. For moderate to heavy loads, flyback converters may control the output voltage by switching a pulse width of a drive signal. For such conditions, some flyback converters can be configured to switch additional reactive elements in parallel to the primary winding using a topology known as active clamp flyback (ACF). However, for light load conditions using a flyback mode such as ACF may result in increased losses and decreased efficiency. Therefore, some flyback converters can be configured to switch to a frequency foldback mode during light loads by lowering operating frequency and disabling the additional reactive elements used in ACF mode. However, converters that change between operating modes based on load conditions may experience large voltage drops when transitioning from light load to heavy load. Moreover, the converter may have a long recovery time when transitioning from light load to heavy load.

Recently, certain regulatory agencies have set strict standards for efficiency and have encouraged the development of power supply controllers that are capable of both high frequency and low frequency operation to operate at low frequencies at light loads and no loads. Thus, the frequency change from no load to full load may vary widely based on the chosen frequency of operation. Known converters, however, have inefficient response to transitions from light load to full load and have difficulty satisfying these requirements at the same time.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
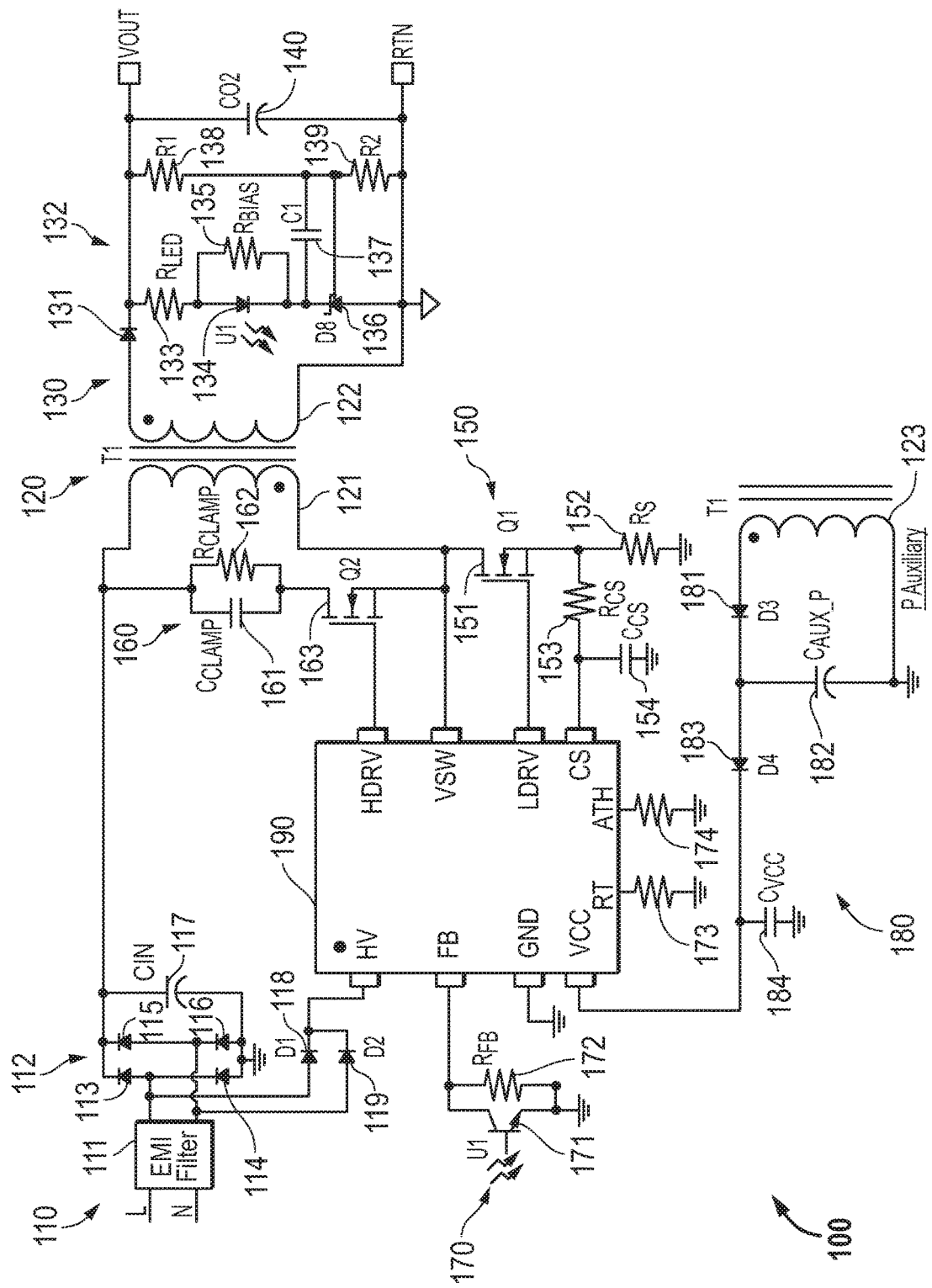
FIG. 1 illustrates in partial block diagram and partial schematic form a switched mode power converter according to an embodiment of the present invention.

FIG. 1 illustrates in partial block diagram and partial schematic form a switched mode power converter 100 according to an embodiment of the present invention. Switched mode power converter 100 is an active clamp flyback (ACF) converter that uses hysteretic ACF switching at normal loads, frequency foldback at light loads, and skip mode at very light loads or in no load conditions to improve its efficiency. Switched mode power converter 100 includes generally a front-end circuit 110, a flyback transformer 120, an output circuit 130, an output capacitor 140, a switching stage 150, an active clamp stage 160, a feedback and programming circuit 170, an auxiliary supply circuit 180, and a switched mode power supply controller 190.

Front-end circuit 110 includes an electromagnetic interference (EMI) filter 111, a diode bridge rectifier 112, an input capacitor 117, and diodes 118 and 119. EMI filter 111 has inputs labeled "L" and "N" for connection to an alternating current (AC) mains, and first and second outputs. Diode bridge rectifier 112 includes diodes 113, 114, 115, and 116. Diode 113 has an anode connected to the first output of EMI filter 111, and a cathode. Diode 114 has an anode connected to a primary ground, and a cathode connected to the first output of EMI filter 111. Diode 115 has an anode connected to the second output of EMI filter 111, and a cathode connected to the cathode of diode 113. Diode 116 has an anode connected to primary ground, and a cathode connected to the second output of EMI filter 111. Input capacitor 117 has a first terminal connected to the cathodes of diodes 113 and 115, and a second terminal connected to primary ground. Diode 118 has an anode connected to the first output of EMI filter 111, and a cathode. Diode 119 has an anode connected to the second output of EMI filter 111, and a cathode connected to the cathode of diode 118.

Flyback transformer 120 is a magnetic core transformer having a primary winding 121, a secondary winding 122, and an auxiliary winding 123. Primary winding 121 has a first end connected to the cathodes of diodes 113 and 115, and a second end. Secondary winding 122 and auxiliary winding 123 each have first and second ends.

Output circuit 130 includes a diode 131 and a feedback circuit 132. Diode 131 has an anode connected to the first end of secondary winding 122, and a cathode for providing an output voltage labeled "VOUT" to a load, not shown in FIG. 1. Feedback circuit 132 includes a resistor 133, a photodiode 134, a resistor 135, a Zener diode 136, a capacitor 137, and resistors 138 and 139. Resistor 133 has a first terminal connected to the anode of diode 131, and a second terminal. Photodiode 134 has an anode connected to the second terminal of resistor 133, and a cathode. Resistor 135 has a first terminal connected to the second terminal of 25 resistor 133, and a second terminal connected to the cathode of photodiode 134. Zener diode 136 has a cathode connected to the cathode of photodiode 134 and to the second terminal of resistor 135, and an anode connected to a secondary ground. Capacitor 137 has a first terminal connected to the cathode of photodiode 134, to the cathode of Zener diode 136, and to the second terminal of resistor 135, and a second terminal. Resistor 138 has a first terminal connected to the cathode of diode 131 and to the first terminal of resistor 133, and a second terminal connected to the second terminal of capacitor 137. Resistor 139 has a first terminal connected to the second terminal of capacitor 137 and to the second terminal of resistor 138, and a second terminal connected to secondary ground.

Output capacitor 140 has a first terminal connected to the cathode of diode 131, the first terminal of resistor 133, and the first terminal of resistor 138, and a second terminal connected to secondary ground.

Switching stage 150 includes a transistor 151, resistors 152 and 153, and a capacitor 154. Transistor 151 is an N-channel metal-oxide-semiconductor (MOS) transistor having a drain connected to the second end of primary winding 121, a gate, and a source. Resistor 152 has a first terminal connected to the source of transistor 151, and a second terminal connected to primary ground. Resistor 153 has a first terminal connected to the source of transistor 151 and to the first terminal of resistor 152, and a second terminal. Capacitor 154 has a first terminal connected to the second terminal of resistor 153, and a second terminal connected to primary ground.

Active clamp stage 160 includes a capacitor 161, a resistor 162, and a transistor 163. Capacitor 161 has a first terminal connected to cathodes of diodes 113 and 115 and to the first terminal of input capacitor 117, and a second terminal. Resistor 162 has a first terminal connected to cathodes of diodes 113 and 115 and to the first terminal of input capacitor 117, and a second terminal connected to the second terminal of capacitor 161. Transistor 163 is an N-channel MOS transistor having a drain connected to the second terminals of capacitor 161 and resistor 162, a gate, and a source connected to the second end of primary winding 121 and to the drain of transistor 151.

Feedback and programming circuit 170 includes a phototransistor 171, and resistors 172, 173, and 174. Phototransistor 171 has a collector, a base optically coupled to photodiode 134, and an emitter connected to primary ground. Resistor 172 has a first terminal connected to the collector of phototransistor 171, and a second terminal connected to primary ground. Resistor 173 has a first terminal, and a second terminal connected to primary ground. Resistor 174 has a first terminal, and a second terminal connected to primary ground.

Auxiliary supply circuit 180 includes a diode 181, a capacitor 182, a diode 183, and a capacitor 184. Diode 181 has an anode connected to the first end of auxiliary winding 123, and a cathode. Capacitor 182 has a first terminal connected to the cathode of diode 181, and a second terminal connected to primary ground. Diode 183 has an anode connected to the cathode of diode 181 and to the first terminal of capacitor 182, and a cathode. Capacitor 184 has a first terminal connected to the cathode of diode 183, and a second terminal connected to primary ground.

Switched mode power supply controller 190 is an integrated circuit that controls the operation of switched mode power converter 100. Switched mode power supply controller 190 has a set of terminals labeled "HV", "FB", "GND", "VCC", "RT", "ATH", "CS", "LDRV", "VSW", and "HDRV". The HV terminal is connected to the cathodes of diodes 118 and 119. The FB terminal is connected to the collector of phototransistor 171 and to the first terminal of resistor 172. The GND terminal is connected to primary ground. The VCC terminal is connected to the cathode of diode 183 and to the first terminal of capacitor 184. The RT terminal is connected to the first terminal of resistor 173. The ATH terminal is connected to the first terminal of resistor 174. The CS terminal is connected to the second terminal of resistor 153 and to the first terminal of capacitor 154. The LDRV terminal is connected to the gate of transistor 151. The VSW terminal is connected to the second end of primary winding 121, the drain of transistor 151, and the source of transistor 163. The HDRV signal is connected to the gate of transistor 164.

Front-end circuit 110 has L and N inputs for coupling to an AC mains. Diode bridge rectifier 112 converts the sinusoidal AC mains signal into a half-wave rectified (haversine) signal and input capacitor 117 smoothes this signal to form a smoothed haversine signal that is provided to the first end of primary winding 121 of flyback transformer 120.

Output circuit 130 rectifies the signal at the first end of secondary winding 122. Feedback circuit 132 provides an isolated, optical feedback signal proportional to a difference between VOUT and the breakdown voltage of Zener diode 136, while filtering high frequency fluctuations in VOUT. Photodiode 134 and phototransistor 171 are isolated and logically separated between the secondary side of flyback transformer 120 and the primary side of flyback transformer 120, respectively, but are implemented together as an opto-coupler. Output capacitor 140 provides smoothing for VOUT during load transients.

In switching stage 150, transistor 151 is made conductive to cause current flow through primary winding 121 of flyback transformer 120. Resistor 152 is a current sense resistor whose first terminal provides a voltage that indicates the amount of current flowing through primary winding 121. The current sense signal allows for PWM control as well as cycle-by-cycle current limiting. Resistor 153 and capacitor 154 operate to filter out high frequency content of the current sense signal.

Active clamp stage 160 forms an active clamp and transistor 163 is conductive during portions of the off times of transistor 151 to allow for zero-voltage switching (ZVS). Switched mode power supply controller 190 uses the VSW input to determine when to deactivate the active clamp.

Feedback and programming circuit 170 provides a mechanism to regulate VOUT and also to program the foldback function. Phototransistor 171 conducts a current proportional to VOUT to form a feedback signal. Switched mode power supply controller 190 uses currents conducted by resistors 173 and 174 to determine the foldback ending frequency and the foldback ending voltage.

Auxiliary supply circuit 180 provides a power supply voltage labeled "VCC" that powers the internal circuits of switched mode power supply controller 190. Switched mode power supply controller 190 is an integrated circuit controller that has various functions useful in the implementation of an ACF controller that are not disclosed in detail.

Switched mode power converter 100 is an ACF converter that switches current through the primary side of flyback transformer 120 to generate output voltage VOUT. ACF converters can reduce electric stress on components and improve efficiency by achieving close to ZVS of the primary switch and to produce clean drain waveforms without any ringing. They also allow soft increase in secondary current.

For medium and heavy loads, switched mode power converter 100 operates in ACF mode. Switch mode power converter 100 includes not only transistor 151, but also a reactive element—capacitor 161—in parallel with primary winding 121 of flyback transformer 120 that resonates when transistor 163 is conductive. Switched mode power supply controller 190 makes transistor 163 conductive during portions of the off times of transistor 151 and varies the duty cycle of transistor 163. In this way switched mode power converter 100 uses the energy stored in parasitics to achieve ZVS instead of dissipating the energy in a snubber circuit. Switched mode power converter 100 also reduces spikes that occur due to switching transients, resulting in lower electromagnetic interference (EMI).

For light loads, switched mode power converter 100 operates as a discontinuous conduction mode (DCM) flyback converter with frequency foldback. In DCM foldback mode, transistor 163 remains nonconductive such that switched mode power converter 100 operates as a conventional flyback converter. However switched mode power converter 100 also folds back its operating frequency to improve converter efficiency as the load lightens and to meet the strict requirements for standby and system efficiency imposed by various worldwide regulatory authorities.

For very light loads, switched mode power converter 100 operates in a skip mode, in which it keeps transistor 151 non-conductive for periods of time until VOUT falls enough to resume switching. The frequency of the oscillator used for switching the PWM converter is held at a constant, low frequency that is chosen to be above the human audible frequency range, for example 25 kilohertz (kHz).

In order to provide switched mode power supply controller 190 in integrated circuit form, it is desirable to provide enough flexibility to meet varying design requirements in various operating modes. Switched mode power supply controller 190 provides this flexibility by modulating operating frequency during a mode transition and varying feedback signal gain after the mode transition is complete. Modulating the operating frequency during the mode transition provides a gradual increase in clock frequency in order to increase the amount of power the switched mode power converter can supply prior to transition to ACF mode. Varying feedback signal gain after the mode transition is complete provides for an increase in DCM foldback efficiency while preserving ACF performance.

Figure 2:
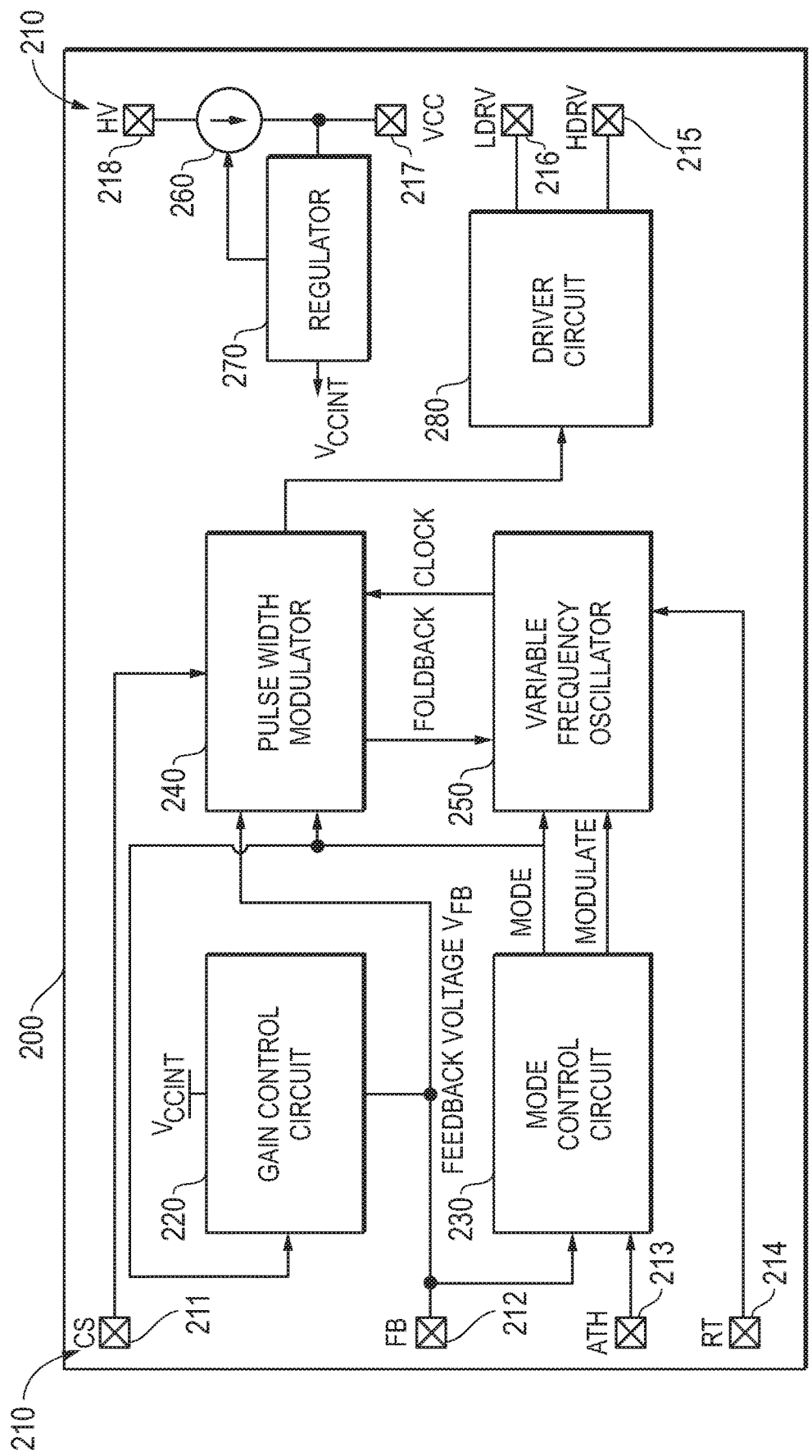
FIG. 2 illustrates in partial block diagram and partial schematic form a switched mode power supply controller that can be used as the switched mode power supply controller of FIG. 1.

FIG. 2 illustrates in partial block diagram and partial schematic form a switched mode power supply controller 200 that can be used as switched mode power supply controller 190 of FIG. 1. Switched mode power supply controller 200 includes generally a set of external terminals 210, a gain control circuit 220, a mode control circuit 230, a pulse width modulator (PWM) 240, a variable frequency oscillator 250, a current source 260, a regulator 270, and a driver circuit 280. External terminals 210 include a CS terminal 211, a FB terminal 212, an ATH terminal 213, a RT terminal 214, a HDRV terminal 215, a LDRV terminal 216, a VCC terminal 217, and a HV terminal 218. Gain control circuit 220 has a first terminal for receiving a power supply voltage labeled "$V_{CCINT}$", a second terminal connected to FB terminal 212, and a control input for receiving a MODE signal. Mode control circuit 230 has a first input connected to FB terminal 212, a second input connected to ATH terminal 213, a first output for providing the MODE signal, and a second output for providing a MODULATE signal. PWM circuit 240 has a first input connected to FB terminal 212, a second input for receiving the MODE signal, a third input for receiving a CLOCK signal, a first output for providing a FOLDBACK signal, and a second output. Variable frequency oscillator 250 has a first input for receiving the FOLDBACK signal, a second input for receiving the MODE signal, a third input for receiving the MODULATE signal, a fourth input connected to RT terminal 214, and an output for providing the CLOCK signal. Current source 260 has a first terminal connected to HV terminal 218, a second terminal connected to VCC terminal 217, and a control terminal. Regulator 270 has an input connected to the second terminal of current source 260, an output for providing voltage $V_{CCINT}$, and a control output connected to the control input of current source 260. Driver circuit 280 has an input connected to the second output of PWM 240, a first output connected to LDRV terminal 216, and a second output connected to HDRV terminal 215.

In operation, switched mode power supply controller 200 is an integrated circuit that operates as a multi-mode controller and is suitable for use as switched mode power supply controller 190 of FIG. 1. In other embodiments switched mode power supply controller 200 could be implemented as a fixed frequency flyback controller with mode control and/or gain variation as described herein.

On system startup, HV terminal 218 ramps voltage $V_{CCINT}$ quickly before auxiliary winding 123 of FIG. 1 is able to supply sufficient current to power the circuits inside switched mode power supply controller 200. Regulator 270 makes current source 260 operational and HV terminal 218 provides startup current to charge capacitor 184 of FIG. 1. Regulator 270 also provides voltage $V_{CCINT}$ to the internal circuits of switched mode power supply controller 200 based on the voltage on VCC terminal 217.

After startup for medium and heavy loads, switched mode power supply controller 200 operates in ACF mode and uses the magnetizing currents in primary winding 121 to achieve ZVS. The ACF controller activates the LDRV and HDRV signals in a manner that is well known in the art and will not be described further here.

For light loads, switched mode power supply controller 200 operates in DCM foldback mode using dynamic frequency foldback. Variable frequency oscillator 250 receives a scaled version of the FB signal output from PWM 240 and uses it to generate the CLOCK signal. As the scaled FB signal varies within a foldback voltage range, the frequency of the CLOCK signal varies proportionally in a foldback frequency range. The user, however, can set a foldback ending voltage and a foldback ending frequency using the ATH and RT terminals, respectively. PWM 240 compares the divided value of $V_{FB}$ to the current sense signal to vary the on time of transistor 151 of FIG. 1, while transistor 163 remains non-conductive.

For very light loads, such as when the load transitions to a standby state or is turned fully off, switched mode power supply controller 200 operates in skip mode. PWM 240 determines whether $V_{FB}$ is less than a skip threshold which corresponds to a foldback starting voltage. In this case switched mode power supply controller 200 uses the value of the skip threshold, i.e. 0.4 volts, to enter skip mode and to deactivate PWM 240. When $V_{FB}$ is less than the skip threshold, PWM 240 prevents transistor 151 from being active.

When $V_{FB}$ subsequently rises above 0.4 volts, such as when the load transitions from a standby state to an active state, switched mode power supply controller 200 returns to DCM foldback mode and remains in DCM foldback mode with variable frequency oscillator 250 providing a CLOCK signal proportional to $V_{FB}$ until $V_{FB}$ rises above the foldback ending voltage.

Unlike known multi-mode switched mode power supply controllers, however, switched mode power supply controller 200 improves the mode transient response when it transitions from DCM foldback mode to ACF mode in response to a sudden step change in the load. When $V_{FB}$ crosses a commit threshold (e.g., the foldback ending voltage described with respect to FIG. 1 above), such as when the load transitions from a light load to a medium load, switched mode power supply controller 200 commits to transition to ACF mode in a manner to be more fully described below. Mode control circuit 230 compares a magnitude of $V_{FB}$ to the commit threshold, and when the magnitude of $V_{FB}$ crosses the commit threshold in a first direction, mode control circuit 230 commits to transitioning to ACF mode and increases the clock frequency of variable frequency oscillator 250 via the MODULATE signal. Mode control circuit 230 continues to increase the clock frequency of variable frequency oscillator 250 every switching cycle until the magnitude of $V_{FB}$ crosses a confirm threshold in a second direction opposite the first direction. When the magnitude of $V_{FB}$ crosses the confirm threshold in the second direction, subsequently to the magnitude of $V_{FB}$ having crossed the commit threshold in the first direction, mode control circuit 230 completes the transition to ACF mode via changing the MODE signal to a logic high. When the operating mode changes to ACF mode, gain control circuit 220 varies the gain between the feedback current into FB terminal 212 and $V_{FB}$ in response to the MODE signal being high. By modulating the frequency before completing the transition to ACF mode, switched mode power supply controller 200 increases power provided at the beginning of ACF operation when it is needed due to the sudden increase in the load. By varying the gain according to the mode, switched mode power supply controller 200 provides better performance at light load while preserving the performance at heavier loads.

Note that switched mode power supply controller 200 could be implemented as a fixed frequency flyback controller operating at the foldback ending frequency for medium and heavy loads using variable frequency oscillator 250. In this case, the ACF controller, HDRV terminal 215, and the ACF portion of driver circuit 280 could all be omitted.

Figure 3:
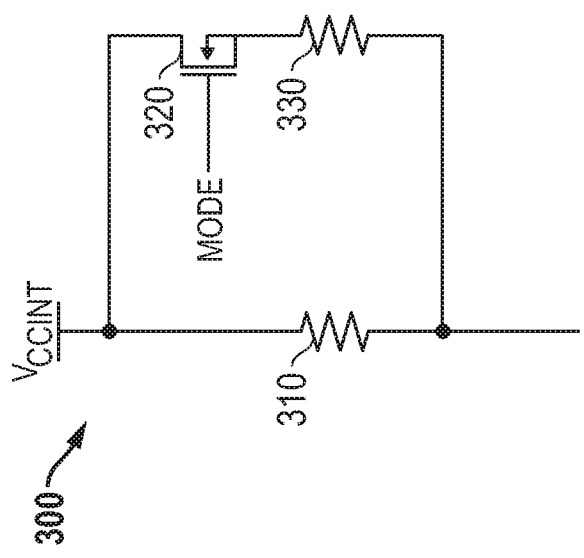
FIG. 3 illustrates in schematic form a gain control circuit that can be used as the gain control circuit of FIG. 2.

FIG. 3 illustrates in schematic form a gain control circuit 300 that can be used to implement gain control circuit 220 of FIG. 2. In general, gain control circuit 300 is a circuit that sets the gain between the feedback signal into FB terminal 212 of FIG. 2 and $V_{FB}$. Gain control circuit 300 includes resistors 310 and 330, and a transistor 320.

Resistor 310 has a first terminal for receiving voltage $V_{CCINT}$, and a second terminal connected to FB terminal 212 of FIG. 2. Transistor 320 is an N-channel metal-oxide-semiconductor (MOS) transistor having a drain for receiving voltage $V_{CCINT}$, a gate for receiving the MODE signal, and a source. Resistor 330 has a first terminal connected to the source of transistor 320, and a second terminal connected to the second terminal of resistor 310.

In operation, gain control circuit 300 provides an adjustment in feedback signal gain in response to a change in operating mode. For light loads, while the switched mode power supply controller operates in DCM foldback mode, transistor 320 is switched off. During this time the gain for the feedback signal is set by first resistor 310. After the switched mode power supply controller transitions from light load to medium or heavy load, the MODE signal indicates operation in ACF mode and turns transistor 320 on. During this time the gain is set by both first resistor 310 and second resistor 330.

Figure 4:
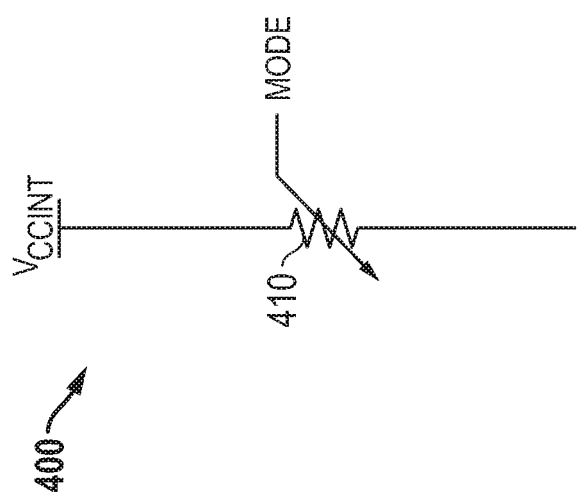
FIG. 4 illustrates in schematic form another gain control circuit that can be used as the gain control circuit of FIG. 2.

FIG. 4 illustrates in schematic form another gain control circuit 400 that can be used to implement gain control circuit 220 of FIG. 2. In general, gain control circuit 400 is a circuit that sets the gain between the feedback signal in FB terminal 212 of FIG. 2 and $V_{FB}$. Gain control circuit 400 includes a variable resistor 410. Variable resistor 410 has a first terminal for receiving voltage $V_{CCINT}$, a second terminal connected to FB terminal 212 of FIG. 2, and a control input for receiving the MODE signal.

In operation, gain control circuit 400 provides an adjustment in feedback signal gain in response to a change in operating mode. For light loads, while the switched mode power supply controller operates in DCM foldback mode, the variable resistor 410 has a relatively high resistance. After the switched mode power supply controller transitions from light load to medium or heavy load, the MODE signal indicates a change to ACF mode and reduces the resistance of variable resistor 410.

Figure 5:
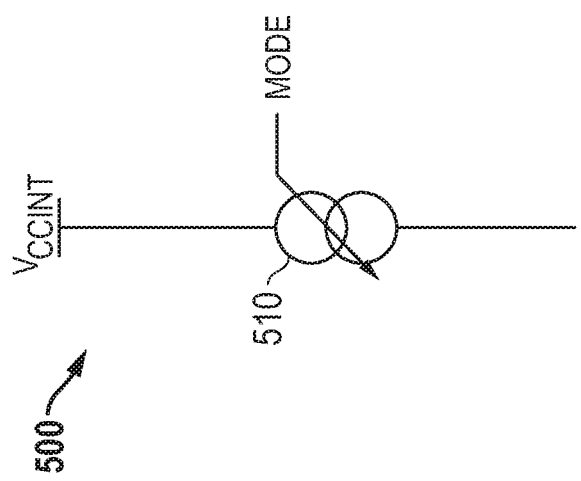
FIG. 5 illustrates in schematic form yet another gain control circuit that can be used as the gain control circuit of FIG. 2.

FIG. 5 illustrates in schematic form yet another gain control circuit 500 that can be used to implement gain control circuit 220 of FIG. 2. In general, gain control circuit 500 is a circuit that sets the gain between the feedback signal in FB terminal 212 of FIG. 2 and $V_{FB}$. Gain control circuit 500 includes a variable current source 510. Variable current source 510 has a first terminal for receiving voltage $V_{CCINT}$, a second terminal connected to FB terminal 212 of FIG. 2, and a control input for receiving the MODE signal.

In operation, gain control circuit 500 provides an adjustment in feedback signal gain in response to a change in operating mode. For light loads, while the switched mode power supply controller operates in DCM foldback mode, the variable current source 510 injects a large current into the feedback signal. After the switched mode power supply controller transitions from light load to medium or heavy load, the MODE signal indicates a change to ACF mode and reduces the current injected by variable current source 510.

Gain control circuits 300, 400 and 500 provide exemplary implementations of gain control circuit 220 of FIG. 2. By using a gain control circuit, switched mode power supply controller 200 of FIG. 2 can have better performance in DCM foldback mode, while maintaining performance in ACF mode.

Note that any of gain control circuits 300, 400, and 500 could be implemented in a fixed frequency flyback controller operating at the foldback ending frequency for medium and heavy loads using a variable frequency oscillator. In this case, the MODE signal would indicate whether the switched mode power converter is in foldback mode or in fixed frequency flyback mode (rather than ACF mode).

Figure 6:
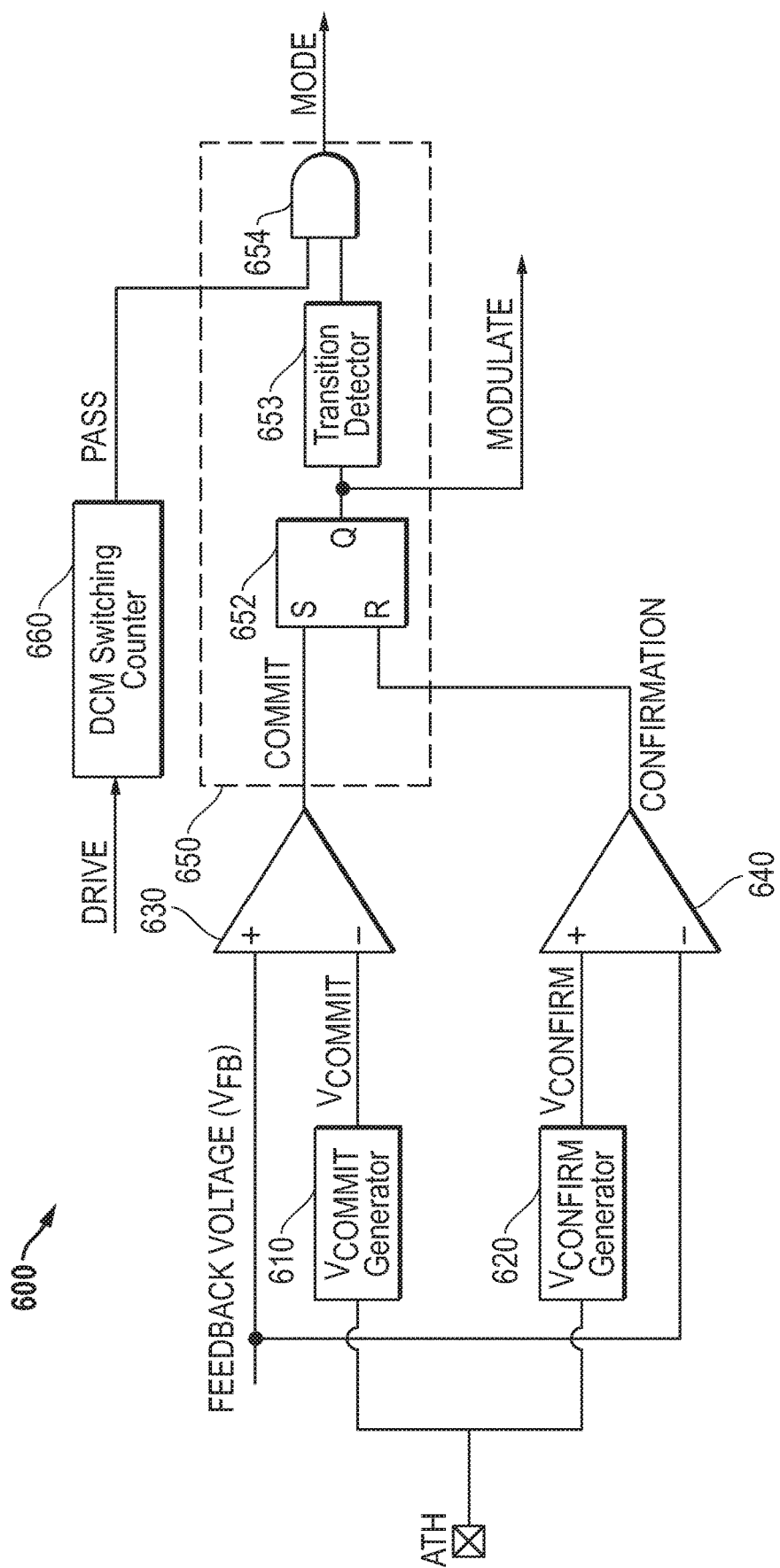
FIG. 6 illustrates in block diagram form a mode control circuit that can be used as the mode control circuit of FIG. 2.

FIG. 6 illustrates in partial block diagram and partial schematic form a mode control circuit 600 that can be used to implement mode control circuit 230 of FIG. 2. In general, mode control circuit 600 is a circuit that detects the magnitude of $V_{FB}$ crossing a commit threshold in a first direction (e.g. rising above the commit threshold) and providing the MODULATE signal, followed by detecting the magnitude of $V_{FB}$ subsequently crossing a confirmation threshold in a second direction opposite the first direction (e.g. falling below the confirmation threshold), and changing the MODE signal to indicate a change in the mode (e.g. to a logic high) as part of the operation of switched mode power supply controller 200 of FIG. 2.

Mode control circuit 600 has a first input connected to FB terminal 212 of FIG. 2, a second input for receiving a signal labeled "DRIVE", a third input connected to ATH terminal 213 of FIG. 2, a first output for providing the MODE signal, and a second output for providing the MODULATE signal. Note that when used in the ACF converter of FIG. 1, the DRIVE signal corresponds to the LDRV signal. Mode control circuit 600 includes reference generator circuits 610 and 620, comparison circuits 630 and 640, a logic circuit 650, and a DCM switching counter 660.

Reference generator circuit 610 is a voltage reference generator with an input connected to ATH terminal 213 of FIG. 2, and an output for providing a commit threshold voltage ($V_{COMMIT}$). Reference generator 620 is a voltage reference generator with an input connected to ATH terminal 213 of FIG. 2, and an output for providing a confirmation threshold voltage ($V_{CONFIRM}$). In the illustrated embodiment, the value of the signal on ATH terminal 213 of FIG. 2 is used to program the values of the outputs of reference generators 610 and 620. Comparison circuit 630 is a voltage comparator with a non-inverting input for receiving $V_{FB}$, an inverting input for receiving $V_{COMMIT}$, and an output for providing a signal labeled "COMMIT". Comparison circuit 640 is a voltage comparator with a non-inverting input for receiving a confirm threshold voltage ($V_{CONFIRM}$), an inverting input for receiving $V_{FB}$, and an output for providing a signal labeled "CONFIRMATION".

Logic circuit 650 has a first input for receiving the COMMIT signal, a second input for receiving the CONFIRMATION signal, a third input, a first output for providing the MODULATE signal, and a second output for providing the MODE signal. Logic circuit 650 includes a committing latch 652, a transition detector 653, and an AND gate 654. Committing latch 652 is an SR latch with a set input labeled "S" for receiving the COMMIT signal, a reset input labeled "R" for receiving the CONFIRMATION signal, and an output labeled "Q" for providing the MODULATE signal. Transition detector 653 has an input for receiving the MODULATE signal and an output. AND gate 654 has a first input for receiving a signal labeled "PASS", a second input connected to the output of transition detector 653, and an output for providing the MODE signal. DCM switching counter 660 is a digital counter with an input for receiving the DRIVE signal, and an output for providing the PASS signal.

For light loads, mode control circuit 600 provides the MODE signal in a logic state indicating a DCM foldback mode of operation. During this time DCM switching counter 660 counts the number of times transistor 151 of FIG. 1 is switched on.

For medium and heavy loads, mode control circuit 600 provides the MODE signal in a particular logic state (i.e. logic high in mode control circuit 600) to indicate the ACF mode of operation. Comparison circuit 630 compares the magnitude of $V_{FB}$ to $V_{COMMIT}$, and when the magnitude of $V_{FB}$ rises above $V_{COMMIT}$, such as when the load transitions from a light load to a medium or heavy load, comparison circuit 630 activates the COMMIT signal at a logic high to set committing latch 652, making the MODULATE signal a logic high to increase the DCM switching frequency of switched mode power supply controller 200 of FIG. 2 by successive steps. After each DCM switching cycle while the MODULATE signal is active, variable frequency oscillator 250 of FIG. 2 continues to increase the DCM switching frequency of switched mode power supply controller 200 of FIG. 2. Comparison circuit 640 compares the magnitude of $V_{FB}$ to $V_{CONFIRM}$, and when the magnitude of $V_{FB}$ falls below $V_{CONFIRM}$, comparison circuit 640 changes the CONFIRMATION signal to logic high, which resets committing latch 652 and changes the MODULATE signal to logic low. Transition detector 653 detects when the MODULATE signal transitions from a logic high to a logic low and changes its output to logic high. DCM switching counter 660 changes the PASS signal to logic high once a number of DCM switching cycles, e.g. 16 cycles, have occurred since initially entering DCM foldback mode. When the PASS signal and the output of transition detector 653 are both high, AND gate 654 generates the MODE signal in a logic high state, transitioning switched mode power supply controller 200 of FIG. 2 from DCM foldback mode to ACF mode. Comparison circuits 630 and 640 operate in conjunction with logic circuit 650 and DCM switching counter 660 to ensure that $V_{FB}$ has fallen below $V_{CONFIRM}$ subsequently after having risen above $V_{COMMIT}$ and that a minimum number of DCM switching cycles have occurred before generating the MODE signal in a logic high state.

Mode control circuit 600 provides an exemplary implementation of mode control circuit 230 of FIG. 2, and other implementations are possible. By committing to enter ACF mode before confirming the transition to ACF mode, mode control circuit 600 causes the switched mode power supply to remain in DCF mode while increasing the switching frequency, thus providing better load transient response, while eventually operating the converter at the more efficient ACF mode thereafter.

Note that mode control circuit 600 may modulate the duty cycle of a fixed frequency oscillator in place of the frequency of variable frequency oscillator 250 of FIG. 2. Mode control circuit 600 may be implemented in a fixed frequency flyback controller, in this case the MODE signal would indicate whether the switched mode power converter is in foldback mode or in fixed frequency flyback mode. In addition to or in replacement of the CONFIRMATION signal, committing latch 652 may be reset by one or more of: system start-up, system restart, a transition to DCM foldback mode, or a transition to skip mode. Committing latch 652 may be implemented using a flip-flop (rather than a SR latch). In one example embodiment, transition detector 653 may be implemented using a series of D flip-flops, however alternative embodiments of transition detectors may be used. In some embodiments, feedback current decreases as output voltage rises, and in these alternatives, comparison circuits 630 and 640 may have their polarities switched to account for the difference in $V_{FB}$ behavior. In embodiments in which the polarities of comparison circuits 630 and 640 are switched, mode control circuit 600 would commit to the transition to ACF mode when $V_{FB}$ falls below $V_{COMMIT}$, and would confirm the transition to ACF mode when $V_{FB}$ rises above $V_{CONFIRM}$.

Figure 7:
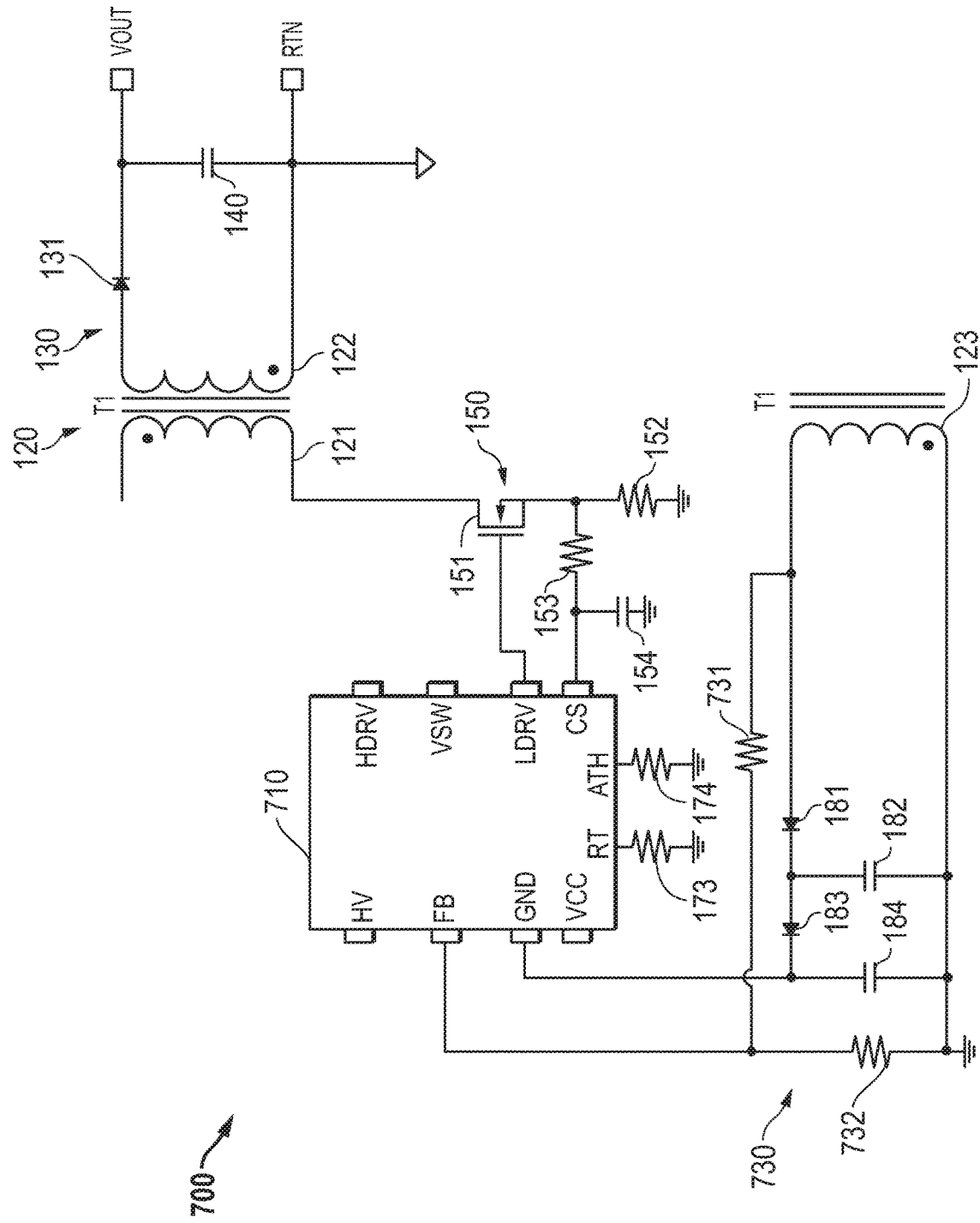
FIG. 7 illustrates in partial block diagram and partial schematic form a portion of a switched mode power converter according to another embodiment of the present invention.

FIG. 7 illustrates in partial block diagram and partial schematic form a portion of a switched mode power converter 700 according to another embodiment of the present invention. Switched mode power converter 700 is an active clamp flyback (ACF) converter that operates similarly to switched mode power converter 100 of FIG. 1, but with a few differences described below. Switched mode power converter 700 includes generally a switched mode power supply controller 710, a feedback circuit 730, and respective elements found in switched mode power converter 100 of FIG. 1.

Switched mode power supply controller 710 is an integrated circuit that controls the operation of switched mode power converter 700. Switched mode power supply controller 710 has the same set of terminals as switched mode power supply controller 190 of FIG. 1. The VCC terminal is connected to a cathode of diode 183 and to a first terminal of capacitor 184. The RT terminal is connected to the first terminal of resistor 173. The ATH terminal is connected to the first terminal of resistor 174. The CS terminal is connected to a second terminal of resistor 153 and to a first terminal of capacitor 154. The LDRV terminal is connected to a gate of transistor 151.

Unlike switched mode power converter 100 of FIG. 1, switched mode power converter 700 includes a feedback circuit 730 that forms the FB signal based on a voltage on auxiliary winding 123 during the off time of transistor 151. Feedback circuit 730 includes resistors 731 and 732. Resistor 731 has a first terminal connected to the first end of auxiliary winding 723, and a second terminal connected to the FB terminal of switched mode power supply controller 710. Resistor 732 has a first terminal connected to the second terminal of resistor 731 and to the FB terminal of switched mode power supply controller 710, and a second terminal connected to primary ground.

In operation, switched mode power converter 700 behaves similarly to switched mode power converter 100 of FIG. 1, except as described herein. Switched mode power converter 700 eliminates the optocoupler of switched mode power converter 100 of FIG. 1 and instead uses resistors 731 and 732 as feedback resistors that provide a voltage that reflects VOUT during the off time of transistor 151. Switched mode power supply controller 710 operates the same except that it receives the FB signal as a voltage, and generates $V_{FB}$ by sampling the voltage on the FB pin during the off-time of flyback transformer 120.

Figure 8:
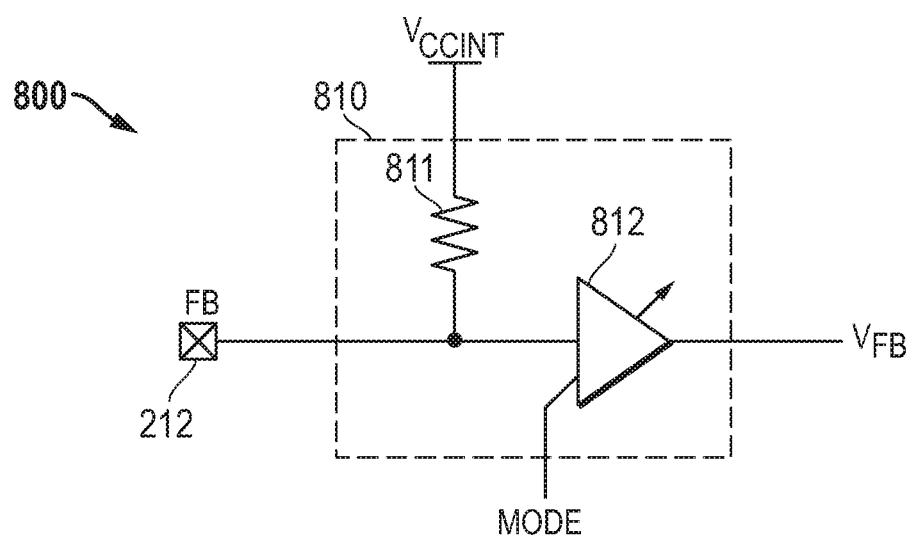
FIG. 8 illustrates in partial block diagram and partial schematic form a further gain control circuit that can be used as the gain control circuit of FIG. 2.

FIG. 8 illustrates in partial block diagram and partial schematic form a further gain control circuit 800 that can be used as gain control circuit 220 of FIG. 2. In general, gain control circuit 800 is a circuit that sets the gain between the feedback signal into FB terminal 212 of FIG. 2 and $V_{FB}$.

Gain control circuit 800 includes a variable gain element 810. Variable gain element 810 includes a resistor 811 and an amplifier 812.

Variable gain element 810 has a first terminal for receiving voltage $V_{CCINT}$, a second terminal connected to FB terminal 212, a third terminal for providing feedback voltage $V_{FB}$, and a control terminal for receiving the MODE signal. Resistor 811 is a pull-up resistor with a first terminal for receiving voltage $V_{CCINT}$, and a second terminal connected to FB terminal 212. Amplifier 812 is a voltage amplifier with a first terminal connected to FB terminal 212 and to the second terminal of resistor 811, a second terminal for providing feedback voltage $V_{FB}$, and a control terminal for receiving the MODE signal.

In operation, gain control circuit 800 provides an adjustment in feedback signal gain in response to a change in operating mode. For light loads, while the switched mode power supply controller operates in DCM foldback mode, amplifier 812 has a relatively high gain. After the switched mode power supply controller transitions from light load to medium or heavy load, the MODE signal indicates ACF mode and lowers the gain of amplifier 812.

Gain control circuit 800 could be modified for use in switched mode power supply controller 710 by removing resistor 811 and adding a sample-and-hold circuit between FB terminal 212 and the input of amplifier 812. In this case, the sample and hold circuit would sample the voltage during the off time of transistor 151, and gain control circuit 800 would provide $V_{FB}$ at a gain set by the MODE signal.

Figure 9:
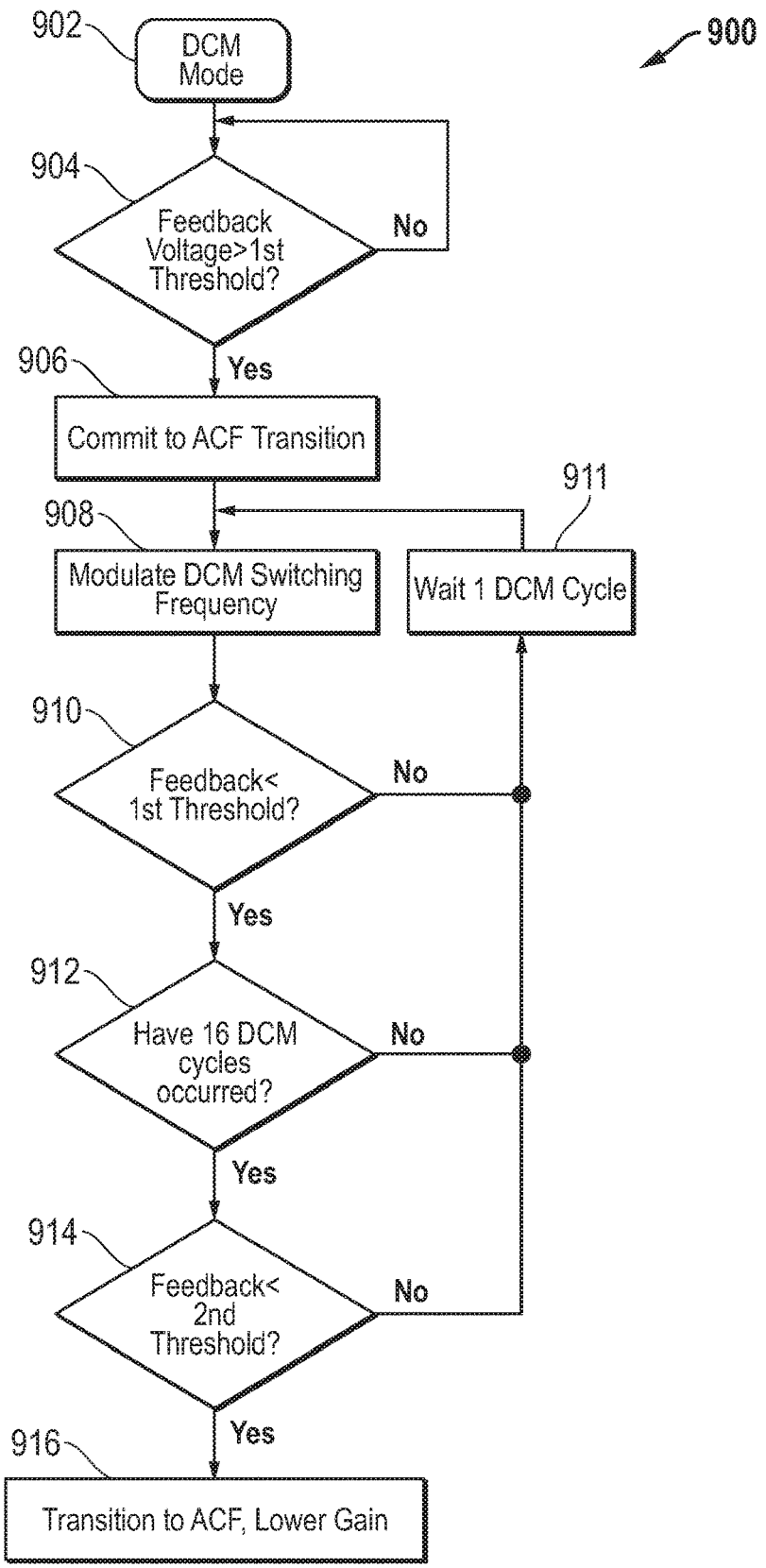
FIG. 9 illustrates a flow chart of a process associated with the operation of the switched mode power supply controller of FIG. 2.

FIG. 9 illustrates a flow chart of a process 900 associated with the operation of switched mode power supply controller 200 of FIG. 2. Process 900 may be performed using circuits similar or identical a combination of one of the various gain control circuits and mode control circuits described previously. Process 900 begins at block 902, when switched mode power supply controller 200 is in DCM foldback mode. At block 904, a feedback voltage ($V_{FB}$) is compared to a first threshold. In one example, $V_{FB}$ is compared to a foldback ending voltage. If $V_{FB}$ is higher than the first threshold, the process proceeds to block 906.

At block 906, switched mode power supply controller 200 commits to transitioning operating modes from DCM foldback mode to ACF mode and process 900 proceeds to block 908. At block 908, the DCM foldback switching frequency is modulated by increasing it one step. At block 910, $V_{FB}$ is again compared to the first threshold. In the one example, if $V_{FB}$ is still higher than the foldback ending voltage, switched mode power supply controller 200 waits one DCM foldback switching cycle (block 911) and returns to block 908. This process is repeated until $V_{FB}$ falls below the foldback ending voltage, at which point the process proceeds to block 912.

At block 912, process 900 counts how many DCM foldback switching cycles have occurred since entering DCM foldback mode. If the number of switching cycles is below a threshold, e.g. 16 cycles, the process waits one DCM foldback switching cycle (block 911) and returns to block 908. Once the threshold is reached the process may proceed to block 914.

At block 914, $V_{FB}$ is compared to a second threshold. In the one example, the second threshold is known as a confirmation threshold. If $V_{FB}$ is above the confirmation threshold, process 900 waits one DCM foldback switching cycle (block 911) and returns to block 908. If $V_{FB}$ is below the confirmation threshold, the process proceeds to block 916 and the mode of operation transitions to ACF. At block 916, process 900 transitions the gain to a lower gain using a gain control circuit as described previously.

Note that process 900 could be implemented in a fixed frequency flyback controller operating at the foldback ending frequency for medium and heavy loads using a variable frequency oscillator. In this case, the process would transition to a fixed frequency flyback mode instead of ACF mode in block 916, but otherwise operates the same as the process shown in FIG. 9. In some embodiments, block 908 may alternatively be implemented by modulating a duty cycle of the switching signal. In some embodiments, feedback current decreases as output voltage rises, and in these alternatives, block 904 would measure if $V_{FB}$ is below the first threshold, block 910 may measure if $V_{FB}$ is above the first threshold, and block 914 may measure if $V_{FB}$ is above the second threshold.

Thus various embodiments of a switched mode power converter, a switched mode power supply controller, and a corresponding method have been described. The various embodiments provide improved transition from DCM foldback mode to ACF mode. They also provide improved performance in DCM foldback mode operation while preserving performance in ACF mode.

The above-disclosed subject matter is to be considered illustrative, and not restrictive, and the appended claims are intended to cover all such modifications, enhancements, and other embodiments that fall within the true scope of the claims. For example, the particular values of starting and ending frequencies and voltages that a switched mode power supply controller chip supports can vary in different embodiments. Moreover the mode transition methods described above can be used in different switched mode power supply converter architectures. For example, various embodiments of gain control circuits and/or mode control circuits can be used for light load to medium or heavy load transition in both conventional flyback converters and ACF converters.

Thus, to the maximum extent allowed by law, the scope of the present invention is to be determined by the broadest permissible interpretation of the following claims and their equivalents, and shall not be restricted or limited by the forgoing detailed description.

What is claimed is:

1. A switched mode power supply controller, comprising:
   a feedback input for receiving a feedback signal;
   a gain control circuit coupled to said feedback input for providing a feedback voltage in response to said feedback signal;
   a pulse width modulator responsive to said feedback voltage and a mode signal for switching a power switch using a drive signal having a pulse width that varies in response to said feedback voltage;
   a mode control circuit having an input for receiving said feedback voltage, a first output for providing a modulate signal in response to a magnitude of said feedback voltage crossing a first level in a first direction, and a second output for providing said mode signal in response to said magnitude of said feedback voltage subsequently crossing a second level different from said first level in a second direction; and
   wherein said gain control circuit varies a gain between said feedback signal and said feedback voltage in response to said mode signal.

2. The switched mode power supply controller of claim 1, wherein said gain control circuit comprises a variable resistance circuit, said variable resistance circuit comprising:
   a first resistor with a first terminal coupled to a power supply terminal, and a second terminal coupled to said feedback input;
   a transistor with a first current electrode coupled to said power supply terminal, a second current electrode, and a control electrode for receiving said mode signal; and
   a second resistor with a first terminal coupled to said second current electrode of said transistor, and a second terminal coupled to said feedback input.

3. The switched mode power supply controller of claim 1, wherein said gain control circuit comprises a variable current circuit, wherein a current of said variable current circuit varies said gain between said feedback signal and said feedback voltage in response to said mode signal.

4. The switched mode power supply controller of claim 1, wherein said gain control circuit comprises:
   a variable gain element having an input coupled to said feedback input, and an output for providing said feedback voltage, wherein said variable gain element is responsive to said mode signal to change a gain thereof.

5. The switched mode power supply controller of claim 1, wherein said mode control circuit comprises:
   a first comparison circuit for providing a commit signal when said magnitude of said feedback voltage is above said first level;
   a second comparison circuit for providing a confirmation signal when said magnitude of said feedback voltage is below said second level; and
   a logic circuit having a first input for receiving said commit signal, a second input for receiving said confirmation signal, a first output for providing said modulate signal, and a second output for providing said mode signal, wherein said mode control circuit changes said mode signal in response to an activation of said confirmation signal following an activation of said commit signal.

6. The switched mode power supply controller of claim 5, wherein said mode control circuit further comprises:
   a counter circuit for providing a pass signal in response to a number of times said drive signal of said pulse width modulator transitions from a first logic state to a second logic state during a first mode of operation reaching a predetermined amount,
   wherein said logic circuit has a third input for receiving said pass signal, wherein said logic circuit inhibits a change in said mode signal until said pass signal is received, and
   wherein the switched mode power supply controller transitions from said first mode of operation to a second mode of operation in response to said change in said mode signal.

7. The switched mode power supply controller of claim 5, wherein:
   the switched mode power supply controller further comprises a variable frequency oscillator for generating a clock signal having a first control input for receiving said modulate signal, wherein said variable frequency oscillator varies a frequency of said clock signal in response to said modulate signal,
   wherein said mode control circuit updates said modulate signal each cycle of said clock signal.

8. The switched mode power supply controller of claim 5, wherein:
   the switched mode power supply controller further comprises a fixed frequency oscillator for generating a clock signal having a first control input for receiving said modulate signal, wherein said fixed frequency oscillator varies an on time or an off time of said clock signal in response to said modulate signal,
wherein said mode control circuit updates said modulate signal each cycle of said clock signal.

9. A switched mode power converter, comprising:
an inductive element having an input for receiving an input voltage, and an output for providing an output voltage;
a power switch having a first current electrode coupled to a terminal of said inductive element, a second current electrode coupled to a power supply terminal, and a control electrode for receiving a drive signal;
a feedback circuit having an input coupled to said output of said inductive element, and an output for providing a feedback signal; and
a switched mode power supply controller, comprising:
  a feedback input for receiving said feedback signal;
  a gain control circuit coupled to said feedback input for providing a feedback voltage in response to said feedback signal;
  a pulse width modulator responsive to said feedback voltage and a mode signal, having an output coupled to said control electrode of said power switch for providing said drive signal with a pulse width that varies in response to said feedback voltage;
  a mode control circuit having an input for receiving said feedback voltage, a first output for providing a modulate signal in response to a magnitude of said feedback voltage crossing a first level in a first direction, and a second output for providing said mode signal in response to said magnitude of said feedback voltage subsequently crossing a second level different from said first level in a second direction; and
  wherein said gain control circuit varies a gain between said feedback signal and said feedback voltage in response to said mode signal.

10. The switched mode power converter of claim 9 further comprising:
a first resistor having a first terminal coupled to said feedback input of the switched mode power supply controller and said output of said feedback circuit, and a second terminal coupled to said power supply terminal; and
said gain control circuit further comprises a variable resistance circuit for varying said gain between said feedback signal and said feedback voltage, said variable resistance circuit comprising:
  a second resistor with a first terminal coupled to an internal supply terminal and a second terminal coupled to said feedback input;
  a transistor with a first current electrode coupled to said power supply terminal, a second current electrode, and a control electrode for receiving said mode signal; and
  a third resistor with a first terminal coupled to said second current electrode of said transistor, and a second terminal coupled to said feedback input.

11. The switched mode power converter of claim 9, wherein said gain control circuit comprises:
a variable gain element having an input coupled to said feedback input, and an output for providing said feedback voltage, wherein said variable gain element is responsive to said mode signal to change a gain thereof.

12. The switched mode power converter of claim 9, wherein said mode control circuit comprises:

a first comparison circuit for providing a commit signal when said magnitude of said feedback voltage is above said first level;
a second comparison circuit for providing a confirmation signal when said magnitude of said feedback voltage is below said second level; and
a logic circuit having a first input for receiving said commit signal, a second input for receiving said confirmation signal, a first output for providing said modulate signal, and a second output for providing said mode signal, wherein said mode control circuit changes said mode signal in response to an activation of said confirmation signal following an activation of said modulate signal.

13. The switched mode power converter of claim 12, wherein said mode control circuit further comprises:
a counter circuit for providing a pass signal in response to a number of switching cycles of said power switch during a first mode of operation reaching a predetermined amount;
wherein said logic circuit has a third input for receiving said pass signal, wherein logic circuit inhibits a change in said mode signal until said pass signal is received; and
wherein said switched mode power supply controller transitions from said first mode of operation to a second mode of operation in response to said change in said mode signal.

14. The switched mode power converter of claim 12, wherein:
said switched mode power supply controller further comprises a variable frequency oscillator for generating a clock signal having a first control input for receiving said modulate signal, wherein said variable frequency oscillator varies a frequency of said clock signal in response to said modulate signal,
wherein said mode control circuit updates said modulate signal each cycle of said clock signal.

15. The switched mode power converter of claim 9, wherein said inductive element is a transformer and the switched mode power converter operates as a flyback power converter.

16. The switched mode power converter of claim 15, wherein:
said transformer has a primary winding with a first end for receiving said input voltage and a second end, and a secondary winding having a first end for providing said output voltage and a second end;
the switched mode power converter further comprises an active clamp circuit coupled between said first end and said second end of said primary winding of said transformer; and
when said feedback signal is greater than a first threshold, the mode control circuit and the gain control circuit transition a mode of operation of the switched mode power converter from a first mode to an active clamp flyback mode.

17. A method for generating a drive signal for a switch in a switched mode power supply comprising:
receiving a feedback signal;
generating a feedback voltage in response to said feedback signal;
modulating a pulse width of a drive signal in response to said feedback voltage and a mode signal;
generating a modulate signal in response to a magnitude of said feedback voltage crossing a first level in a first direction;

generating said mode signal in response to said magnitude of said feedback voltage subsequently crossing a second level in a second direction; and varying a gain between said feedback signal and said feedback voltage in response to said mode signal.

18. The method of claim 17 wherein said generating said mode signal comprises:

committing to a transitioning of modes in response to said generating said modulate signal;

confirming said transitioning of modes when said magnitude of said feedback voltage subsequently falls below said second level; and generating said mode signal in response to said committing to said transitioning of modes and said confirming said transitioning of modes.

19. The method of claim 18 wherein said generating said mode signal comprises:

generating a pass signal in response to a number of times said driving signal has transitioned from a first logic state to a second logic state during a first mode of operation reaching a predetermined amount;

inhibiting said generating of said mode signal until said pass signal is generated; and causing the switched mode power supply to transition from said first mode of operation to a second mode of operation in response to a generation of said mode signal.

20. The method of claim 18 wherein said generating of said mode signal comprises increasing a switching frequency when said magnitude of said feedback voltage is above said first level.

* * * * *